US010521335B2

(12) United States Patent
Mitchell et al.

(10) Patent No.: US 10,521,335 B2
(45) Date of Patent: Dec. 31, 2019

(54) CONTEXT-BASED DEVICE TESTING

(71) Applicant: T-Mobile USA, Inc., Bellevue, WA (US)

(72) Inventors: Michael J. Mitchell, North Bend, WA (US); Peter P. Myron, Renton, WA (US); Samson Kim-Sun Kwong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/882,490

(22) Filed: Jan. 29, 2018

(65) Prior Publication Data

US 2019/0235997 A1 Aug. 1, 2019

(51) Int. Cl.
*G06F 11/36* (2006.01)
*G06N 20/00* (2019.01)

(52) U.S. Cl.
CPC ...... *G06F 11/3688* (2013.01); *G06F 11/3684* (2013.01); *G06F 11/3692* (2013.01); *G06N 20/00* (2019.01); *G06F 11/3664* (2013.01)

(58) Field of Classification Search
CPC .................................................. G06F 11/3688
USPC ....................................................... 717/124
See application file for complete search history.

(56) References Cited

U.S. PATENT DOCUMENTS

| 8,245,194 B2* | 8/2012 | Atkin | G06F 11/3688 717/106 |
| 8,595,703 B2* | 11/2013 | van Gogh | G06F 11/3604 714/38.1 |
| 9,529,701 B2* | 12/2016 | Ekambaram | G06F 11/3664 |
| 9,846,631 B2* | 12/2017 | Lopian | G06F 11/3624 |
| 2015/0220425 A1* | 8/2015 | Yoshida | G06F 11/3684 717/124 |

OTHER PUBLICATIONS

Tim Majchrzak and Matthias Schulte; "Context-Dependent Testing of Applications for Mobile Devices"; Open Journal of Web Technologies (OJWT); 2015 (Year: 2015).*
"Monte Carlo Simulation"; palisade.com website [full URL in ref.] as captured by the Wayback Machine Internet Archive (archive.org) on Jan. 28, 2018 (Year: 2018).*
Sebastian Raschka; "Predictive Modeling, Supervised Machine Learning, and Pattern Classification"; sebastianraschka.com blog website [full URL in ref.]; Aug. 25, 2014 (Year: 2014).*
Junwei Liu, et al.; "Self-learning Monte Carlo Method"; Physical Review B 95.4 (2017): 041101; Jan. 4, 2017 (Year: 2017).*

* cited by examiner

*Primary Examiner* — Qing Chen
*Assistant Examiner* — Clint Thatcher
(74) *Attorney, Agent, or Firm* — Lee & Hayes, P.C.

(57) ABSTRACT

Software applications are tested in different contexts, such as on different devices and under different conditions. During initial testing of an application, conditions of contexts are selected randomly, and the application is tested in each resulting context. After obtaining results from a sufficient number of contexts, the results are analyzed to create a predictive model indicating, for any postulated context, whether testing of the application is most likely to fail or to otherwise produce negative test results. The model is then analyzed to identify contexts that are most likely to produce negative results or failures, and those contexts are emphasized in subsequent application testing.

20 Claims, 4 Drawing Sheets

CONTEXT-BASED DEVICE TESTING

BACKGROUND

Testing is an important part of software development. In many environments, software testing is performed automatically, using test scripts. A test script is a sequence of instructions and/or specifications that exercise a target application, typically by providing inputs and verifying that the corresponding outputs are as expected. For example, a test script may simulate user input of selecting a menu item, and then verify that a particular screen, window, or widget is displayed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described implementations provide for automated testing of systems, devices, and software. More specifically, techniques are provided for determining how to prioritize the contexts within which applications and devices are tested, and to therefore reduce testing time and increase testing effectiveness. The techniques involve first performing testing on one or more target devices using randomly selected contexts. The results of this initial testing are used to build a predictive model indicating, for any postulated context, whether the testing is likely to fail in that context. In future testing on the target device, in future testing of different target devices, and in future testing of revised or different target applications, the system first uses those contexts that are predicted to produce test failures. After testing is performed in these contexts, testing may continue using additional, randomly generated contexts, and the predictive model may be periodically reconstructed based on new test results.

In a described embodiment, a test controller implements test procedures in order to test a target software application on a target device. An individual test procedure, for example, might provide one or more inputs to the target application and then evaluate application responses. For example, the application may respond by producing output such as a window, a pane, a button, an input field, output data, a check box, a menu, a widget, etc., and the procedure may determine whether these outputs differ from expected outputs. The procedure may also detect behaviors of the application other than outputs, such as application crashes, processor utilization by the application, battery consumption attributable to the application, and so forth. In some cases, a test procedure may detect behaviors and/or states of the target device while the application is running. For example, a test procedure may monitor device temperature, whether the device generates error notices, etc.

In some embodiments, the testing described herein may be designed to determine the robustness of an application in the face of various combinations of unexpected, unusual, or extremely variant contexts. For example, a selected context might configure the target device to have very little or no memory available for use by the target application.

A test procedure such as this is performed in a device context. A context corresponds to a set or combination of conditions and/or events under which the application executes. A condition, for example, might comprise the communication bandwidth available to the target application, how many other applications are running at the same time as the target application, battery state, the type of processor used by the target device, etc. Some conditions might be independent of the target device, such as the maximum network bandwidth that is available to the target device for transmitting and receiving network data. Context events may also comprise changes in conditions during testing. A context event might also comprise certain types of inputs to the target application, such as large random text strings. Generally, context is controlled or specified by the test controller rather than by the test procedure.

The test controller is configured to repeatedly execute a test of the target application on the target device, with each execution being in a different context. Depending on the number of variable conditions and events, however, there may be a very large number of possible contexts, each of which is defined by a different permutation of conditions and/or events. Because it takes some time to run a test in each context, it may not be practical to test the target device or application in all possible contexts. However, it can be challenging to predict which of the possible contexts might be most likely to uncover test failures and bugs, and therefore be prioritized during testing.

In one embodiment described herein, the test controller is configured to repeatedly execute a test against a target application, and to randomly select and implement a different context for each execution of the test. The test controller records results of the test for each context. The testing continues over time to obtain multiple test results in different contexts. A test result may be recorded as a data record that identifies a context and the number of failures generated by testing the target application in the context.

In some embodiments, the test result for a particular context may indicate whether the test passed or failed in the context. In other embodiments, the test result might comprise a performance parameter such as a speed, a delay, etc.

The actual test results from multiple contexts are then analyzed using machine learning techniques to produce a model that predicts test results as a function of context. The predictive model is then analyzed to identify contexts that are especially likely to produce test failures or negative results. These contexts are designated as priority contexts. Continued testing on the target device or other target devices is performed first with the priority contexts, rather than randomly selected contexts. After all priority contexts have been tested, further testing may proceed using additional contexts that are generated randomly.

In some embodiments, a Monte Carlo method may be used to create the predictive model. In these embodiments, the contexts may be selected randomly from previously determined probabilistic distributions of condition and/or event variables.

In some cases, certain conditions such as processor type, for example, may correspond to inherent and/or unalterable characteristics of the target device. A condition such as this may be varied by performing the testing on multiple devices having respectively different characteristics. In some implementations, the testing described above may be performed in parallel, on multiple devices of different models or types, to establish actual test results from which a predictive model is constructed.

Figure 1:
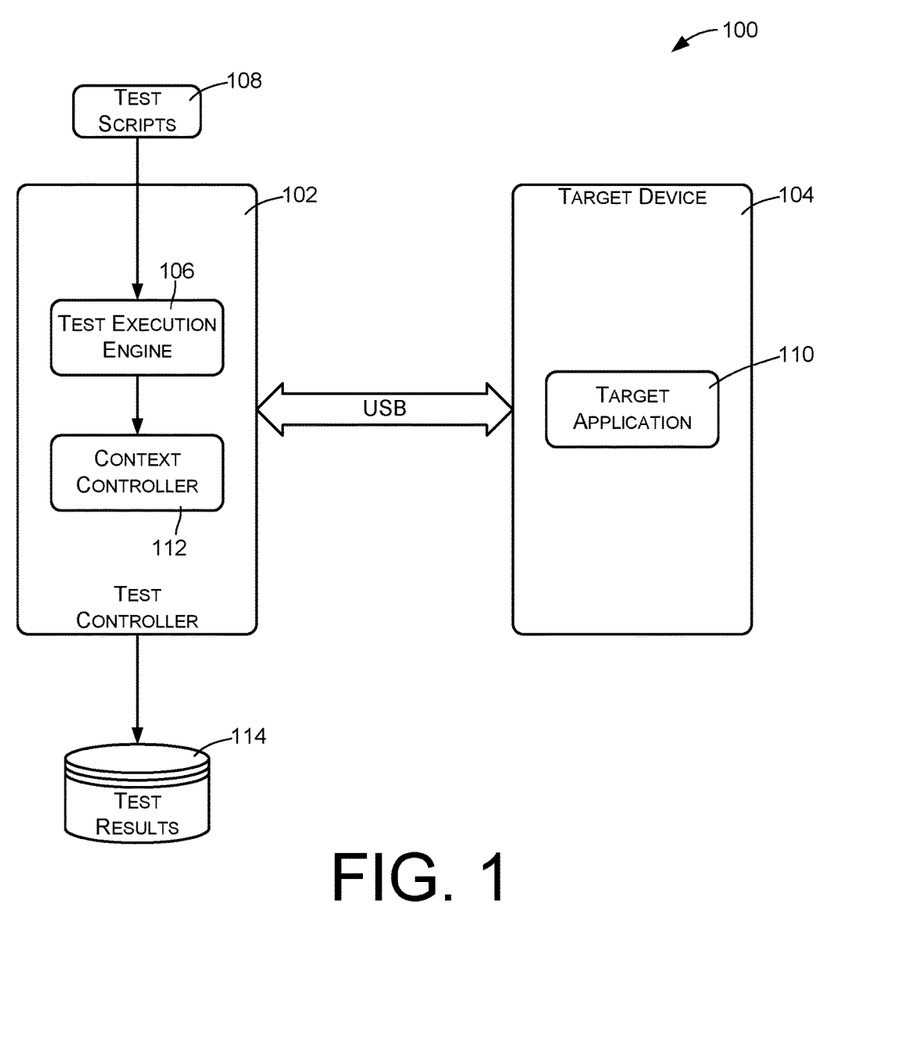
FIG. 1 is a block diagram of an example test environment that may be used to perform device testing.

FIG. 1 shows an example test environment 100 having a test controller 102 and a target device 104. The test controller 102 may comprise a computer, a computer server or some other type of computerized equipment. The target device 104 may comprise any type of device or equipment upon which an application or other software will be tested. Examples of such devices include computers, cellular communications handsets, smartphones, industrial control devices, home automation devices, wearable devices, and any other components having computing capabilities.

In the embodiment of FIG. 1, the test controller 102 communicates with the target device 104 through a USB (Universal Serial Bus) interface. In other embodiments, the test controller 102 may communicate with the target device 104 over a local-area or wide-area network or other communication channel. In some cases, the test controller 102 may access a logical instrumentation interface or API (Application Programming Interface) of the target device 104 in order to perform testing. In an example case where the target device 104 comprises an Android® device, the test controller 102 may access the ADB (Android Debug Bridge) interface of the target Android device. An instrumentation interface such as ADB allows use of a command/query language and syntax to interact with the target device, and allows control of the device for development and testing.

The test controller 102 has a test execution engine 106 for executing test scripts 108. The test execution engine 106 is a software application or component that executes the test scripts 108 against the target device 104. Each test script 108 specifies a test procedure in terms of a sequence of operations to be performed with respect to the target device 104. The test script 108 may contain instructions for installing and initiating a target application 110 on the target device 104, for providing simulated user input or other input to the application 110, for receiving or detecting user interface output, for verifying that the application 110 produces expected output in response to the input, and so forth. These operations are implemented by sending commands to and receiving responses from the logical instrumentation interface of the target device 104. In some embodiments, the test script 108 may request a remote query to verify correct execution of a command (e.g., to verify a data upload).

The test controller 102 may also have a context controller 112 that communicates with the target device 104 through the logical instrumentation interface of the target device 104. The context controller 112 is responsive to the test execution engine 106 to establish an operating context in which the target application will be tested. A context includes the state of the target device 104, which in turn includes various properties and/or conditions of or at the device 104. A context may in some cases also include properties and/or conditions that are external to and/or independent of the device 104, such as whether a wireless network signal is available to the device 104, whether the target device 104 is receiving external power, environmental conditions such as temperature, etc. Context may also include events, such as changes in one or more conditions of the context during test execution.

Device state may include any one or more of the following, without limitation:

a processor speed;
an amount of processor resources available to the target application;
a number of processor cores available to the target application;
an operating system version number;
a type of network communications available to the target application;
a quality of network communications available to the target application;
a number of applications that are running concurrently with the target application;
an amount of device memory that is available for use by the target application;
a battery state;
availability of device peripherals;
etc.

Device state may also include inherent properties or characteristics of the target device. Testing may be performed on different models and types of devices to establish or vary these properties. The following are examples of inherent device properties:

a device type, such as whether the device is a smartphone or a tablet computer;
a device model;
a processor type;
a display type;
a display aspect ratio;
a display resolution;
etc.

Context may also include environmental conditions that are independent of the device, and which may or may not be controllable by the context controller 112, such as temperature, power mains voltage, wireless signal strengths, sources of wireless interference, network congestion, etc.

Device state may be established by specifying values for condition variables or settings, by installing or uninstalling software, by initiating or terminating software, by interacting with device registries and other operating system components, by configuring hardware and electronics, by selecting from different target devices, etc.

In embodiments described herein, the test scripts 108 are designed to operate in any possible context, and the context controller 112 controls the context during execution of the test scripts. In particular, the test execution engine 106 is designed and configured to select a context prior to and/or during the execution of each test script 108, in some cases independent of conditions specified by the test script 108. The context controller establishes the selected context. The selection of contexts will be described more specifically in the following discussion.

Although the test controller 102 of FIG. 1 is shown and described as being a discrete component for purposes of discussion, it may in practice comprise one or more physical, virtual, or otherwise abstracted cluster or network of machines and/or devices. Accordingly, the term "test controller" is intended to reference any one or more computing devices, including physical devices and virtual computing units, and including network-based devices that are commonly referred to as being in the cloud.

Furthermore, although the test execution engine 106 and the context controller 112 are shown and described as discrete components in FIG. 1, the functions attributed above to these components may be performed more generally by various elements of the test controller 102, in some cases with support from other components or services. In the following discussion, actions will be described as performed by the test controller 102, with it being understood that responsibility for these actions may be distributed in different ways between various components and services.

Figure 2:
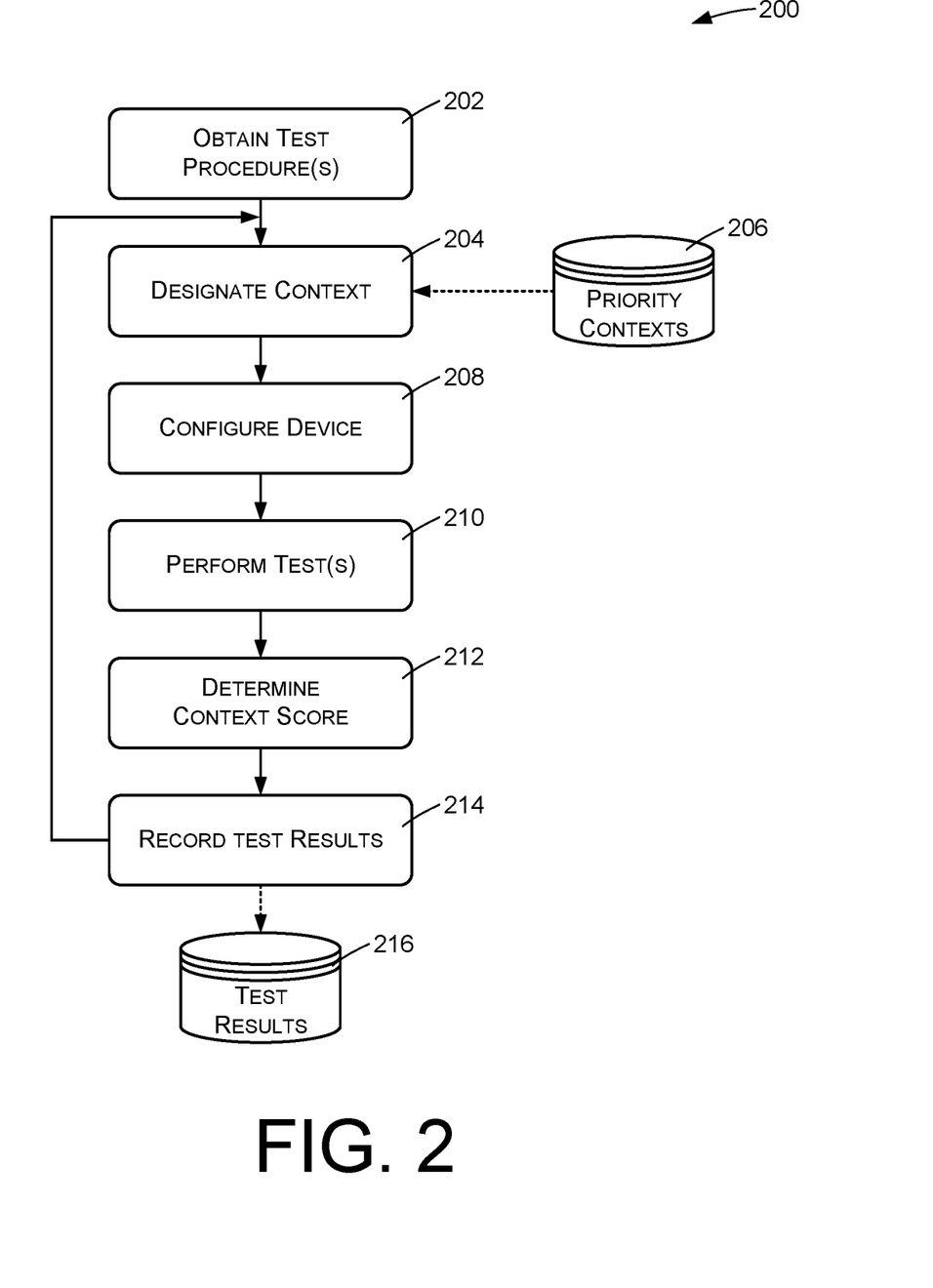
FIG. 2 is a flow diagram illustrating an example method of device testing.

FIG. 2 illustrates an example method 200 of testing one or more target devices, such as the target device 104 of FIG. 1. An action 202 comprises obtaining a test procedure for a test of an application. In the example of FIG. 1, for example, the test controller 102 may obtain one or more of the test scripts 108, each of which is designed for execution against the target application 110. Each test procedure provides test input to the target application 110 and evaluates output of the target application 110 in order to determine whether the target application 110 passes the test. Test input may comprise simulated user input and/or other simulated interactions with the target application 110. In some cases, a test script might also initiate a remote query to verify the proper execution of a command or instruction.

A test script or a combination of test scripts may implement one or more tests, and in some cases, may implement a suite of tests. A test produces one or more outputs, which are evaluated to determine test results. A test might in practice consist of multiple sub-tests, such as a suite of tests, and corresponding results.

An action 204 comprises designating a context. A context may include device states and/or state conditions. Context may also include events that occur or are initiated independently of the test procedure or target device, such as changes to device state or state conditions. In some cases, events may also include simulated user input or other direct input to the target application 110 during execution of the test procedure, such as simulated user entry of a massively long string of randomly generated text.

In some embodiments, the action 204 comprises randomly selecting or generating a device state, such as by randomly designating one or more test conditions under which the test will be performed. In some cases, as will be described in more detail following the discussion of FIG. 3, the action 204 may comprise obtaining a priority context 206 rather than randomly generating a device context or state.

An action 208 comprises configuring the target device 104 to have the selected, designated, or generated device state and/or to operate in the selected, designated, or generated context. In the example of FIG. 1, this may include communicating through the instrumentation interface of the target device 104 and providing values or settings for various parameters of the target device 104. The action 208 may further comprise installing and/or initiating applications, terminating and/or uninstalling applications, configuring hardware elements of the target device 104, and so forth. The actions 208 may further include establishing conditions external to the target device 104, such as network bandwidth restriction or environmental conditions.

An action 210 comprises executing or initiating the test procedure obtained in the action 202, thereby performing the test specified and defined by the test procedure. The test procedure may perform actions such as installing the target application 110, providing input to the target application 110, and evaluating output of the target application 110. A test or sub-test produces one or more test results. A test result may indicate whether the test passed or failed. Alternatively, certain test results might comprise performance parameters such as measurements for speed, delay, memory usage, etc. Passes and failures may in some cases be defined and detected by the test procedure in terms of performance parameter values.

In some cases, the test controller 102 may provide input to the application independently of the test procedure. For example, the test controller 102 may change the device state or other context during execution of the test procedure, such as by changing one or more state conditions.

An action 212 comprises determining a context score for the device context that was designated in the action 204. In the case of a single test, on a single device, the context score equals 0 if the test passed and 1 if the test failed. When test results comprise performance parameters, the context score might range from 0 to 1, corresponding to positive and negative results, respectively. In the case of multiple sub-tests or multiple target devices, the context score may comprise the total number of test failures that occurred during testing of the target application 110 in the designated context, including failures of sub-tests and failures when testing the target application 110 on multiple target devices 104. In cases in which test results comprise performance parameters, the context score may be a sum of the performance parameters.

An action 214 comprises recording test results 216 of the test and/or sub-tests. In some embodiments, the result of a test may be recorded in a database as a test result record, where each record specifies the context within which the test was performed. A record also specifies one or more of (a) whether the target application passed the test in the context, (b) the context score for the context, and/or (c) the performance parameter resulting from the test in the context. In some cases, a test record may include a set of one or more conditions, values, or settings that define a context.

The actions 204, 208, 210, 212, and 214 are repeated in multiple iterations for some length of time, or indefinitely, so that the target application 110 is tested sufficiently in multiple, random device contexts, and possibly on target devices 104 of multiple types and models. As the actions are repeated, new test results 216 are recorded in a test results database.

Figure 3:
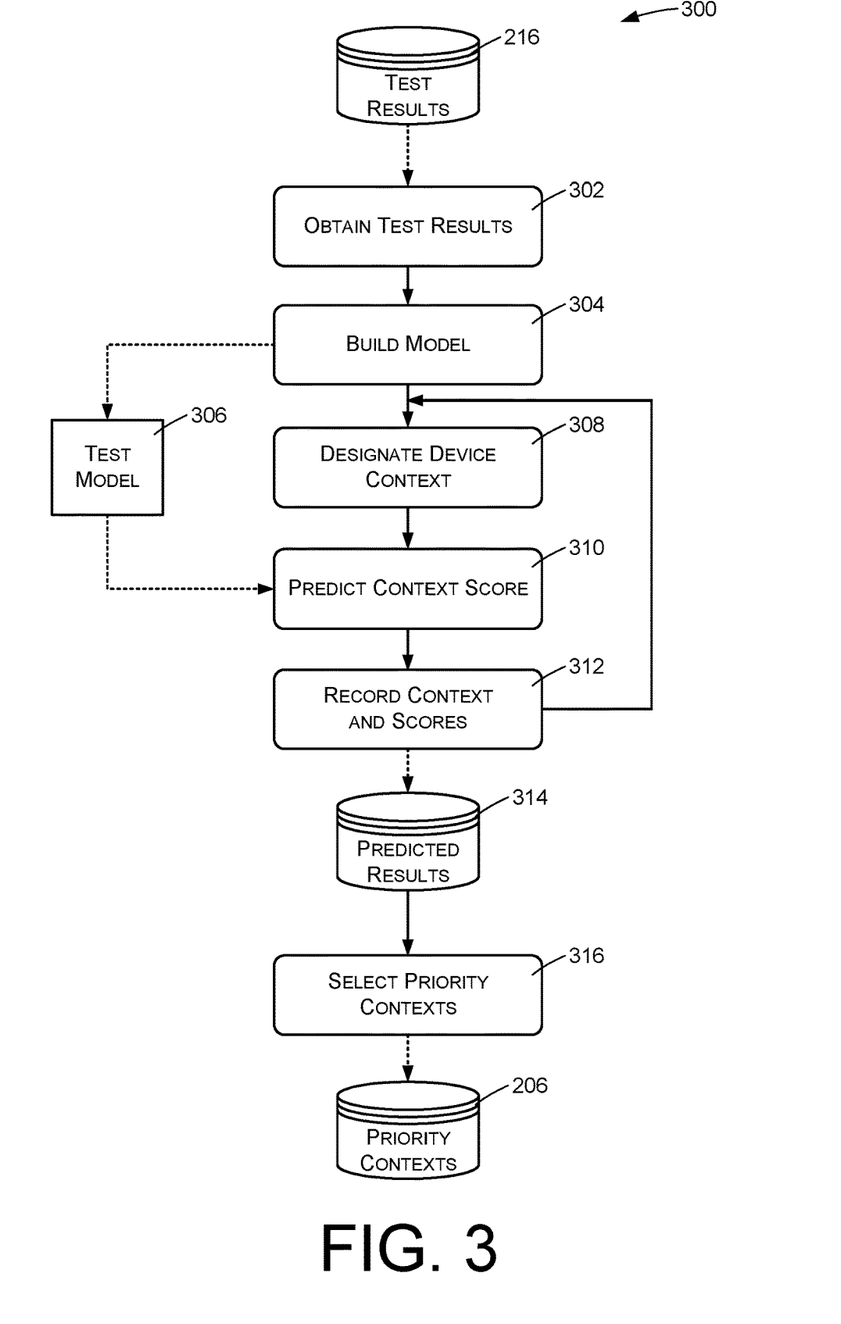
FIG. 3 is a flow diagram illustrating an example method of identifying prioritized contexts for use in the method of FIG. 2.

FIG. 3 illustrates an example method 300 for identifying the priority contexts 206 of FIG. 2. The priority contexts 206 comprise contexts that are predicted to be most likely to result in test failures or negative results, and which will be selected for testing prior to non-priority contexts.

An action 302 comprises obtaining multiple test results 216 of a test, as determined by the method 200 of FIG. 2. Each test result or record indicates a previously tested device state and/or other context. Each test result may indicate whether the test of the target application 110 passed when running in the device state and/or context, or may indicate a performance parameter resulting from the test in the device state and/or context.

An action 304 comprises analyzing multiple records of the test results 216 to create a predictive model 306. The predictive model 306 predicts test results for multiple postulated contexts. In some cases, the predictive model 306 may indicate predicted performance parameters. In other cases, the predictive model 306 may specify postulated contexts, other than the previously tested contexts, that are likely to cause the test of the target application to fail or produce negative results. More specifically, the action 304 may comprise creating a predictive model 306 that predicts whether any postulated device state or other context will cause the test of the target application 110 to fail or produce negative results. For example, the action 304 may comprise using machine learning techniques to create the predictive model 306. When analyzing the test results 216, each context condition may be represented by a corresponding variable. The predictive test 306 accepts as input a set of variables that define a context, and produces an output that indicates, for each context, whether the test is likely to fail when performed in that context and/or a predicted performance parameter. In some cases, the predictive model 306 may indicate the number of test failures that are predicted for a test or test suite in any given context.

As another example, the action 304 may comprise using a Monte Carlo method to create the predictive model 306 based on the test results 216. When using a Monte Carlo method, the action 204 of FIG. 4 may comprise randomly selecting conditions or condition variables based on predetermined probability distributions of the conditions or condition variables.

An action 308 comprises selecting or designating a postulated device context to be analyzed by the predictive model 306. A different postulated device context is selected for each iteration of the action 308. Contexts can be selected or generated randomly, or may be generated using progressions of condition variable values.

An action 310 comprises analyzing the postulated context with the predictive model 306 to predict a context score corresponding to the postulated context. In some cases, the context score is the number of failures that are likely to occur if testing of the target application were to occur in the postulated context.

An action 312 comprises recording a predicted result 314. Each predicted result may be recorded, and may comprise a context and a corresponding context score.

The actions 308, 310, and 312 are repeated for a large number of postulated contexts, to produce a sufficiently large sample of predicted results 314. This can be accomplished using the predictive model 306 much more quickly than performing actual testing in this number of contexts.

An action 316 is performed after the actions 308, 310, and 312 have been repeated in each of a desired number of postulated contexts, creating the predicted results 314. The action 316 comprises selecting priority contexts 206 from the predicted results 314. In some embodiments, the action 316 comprises identifying multiple postulated contexts and/or device states that the predictive model 306 predicts will cause the test of the target application 110 to fail or have relatively negative results, or that are most likely to cause the test of the target application 110 to fail or have relatively negative results. In practice, this might comprise selecting the predicted results having the highest or lowest context scores, or selecting any predicted result having a context score greater than or less than a threshold.

After identifying the postulated contexts or device states, the test can be initiated again, using the method 200, with one or more of the postulated contexts or device states.

Returning now to FIG. 2, the action 204 of designating or selecting a context may be performed differently in different iterations. Initially, when no priority contexts have been identified, the action 204 may comprise randomly generating contexts by specifying random conditions or condition variables. In some cases, particularly when results are measured as passes or fails, the generation of contexts might be subject to the condition that any given context is used only once for testing on a given target device. In other cases, such as when results comprise performance parameters, a given test might be performed more than once in order to refine results or to increase confidence in the test results.

After some number of test results 216 have been obtained by generating random contexts in this manner, the method 300 is performed in order to identify a set of priority contexts 206. In any subsequent iterations of the action 204, contexts will be selected from the priority contexts 206 rather than generating random contexts, again subject to the condition that any given context is used only once for testing on a given target device. When all the priority contexts 206 have been used for testing on any given target device, the action 204 reverts to randomly generating contexts. The method 300 may be performed periodically in order to update the priority contexts 206 in light of new test results 216.

The method 200 may be used in several ways. As one example, initial testing of the target application 110 may be performed on a single target device 104 or a group of target devices. At this point, the priority contexts 206 do not exist, because there are no test results from which to build the predictive model 306. Accordingly, the action 204 at this point comprises designating random contexts and/or conditions. After testing using some number of contexts, the method 300 is performed and the priority contexts 206 become available. When the priority contexts 206 are available, the action 204 comprises selecting from the priority contexts 206. Selection from the priority contexts 206 may begin with the contexts having the highest context scores, and proceed in decreasing order of context scores. When all the priority contexts 206 have been designated and used for testing on any given target device, the action 204 reverts to randomly generating contexts.

As another example, the target application may be tested on a new target device or a group of new target devices, after the priority contexts 206 have been generated. In this case, the action 204 initially comprises selecting from the priority contexts 206. Selection from the priority contexts proceeds in order from highest to lowest context scores. When all the priority contexts 206 have been designated and used for testing on any given target device, the action 204 reverts to randomly generating contexts.

As another example, the target application may be tested on the target device 104 after the target application 110 has been revised, and after testing has been performed on a previous version of the target application 110. In this case, the action 204 initially comprises selecting from the priority contexts 206, which were generated as a result of testing the previous version of the target application. Selection from the priority contexts proceeds in order from highest to lowest context scores. When all the priority contexts 206 have been designated and used for testing on any given target device, the action 204 reverts to randomly generating contexts.

The method 300 may be performed at any time to update the priority contexts 206, based on actual test results from the testing any version of the target application on any of multiple target devices.

Although certain techniques are described herein for testing an application that is executing on a device, the same or similar techniques may be used for any type of testing in which the context of the test may be controlled independently of the test procedure itself.

Figure 4:
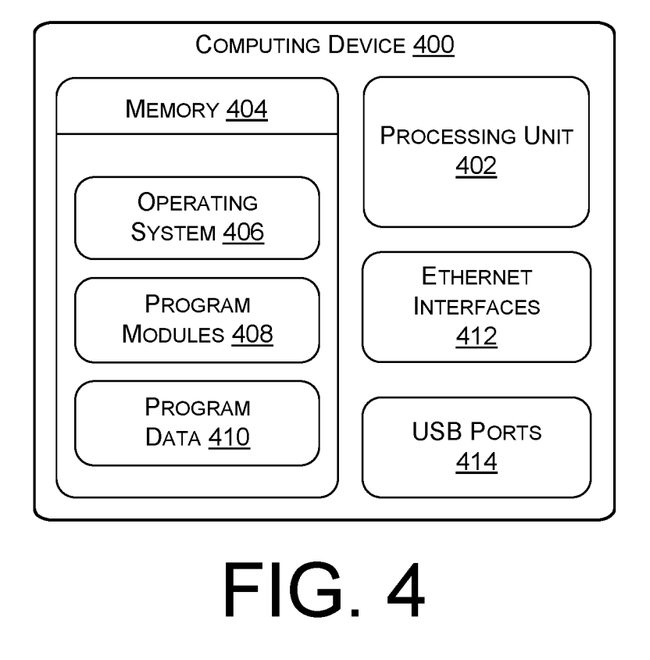
FIG. 4 is a block diagram illustrating example high-level components of a computing device that may be used to implement a test controller such as shown in FIG. 1.

FIG. 4 is a block diagram of an illustrative computing device 400 such as may be used to implement the test controller 102. In some cases, the target device 104 may also comprise a computing device having components similar to those shown in FIG. 4.

In various embodiments, the computing device 400 may include at least one processing unit 402 and memory 404. The memory 404 may store an operating system 406, one or more program modules 408, and program data 410. The memory 404 may also include data storage devices (removable and/or non-removable) such as, for example, magnetic disks, optical disks, or tape.

The memory 404 may comprise non-transitory computer storage media, which may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 400.

In various embodiments, any or all of the memory 404 may store programming instructions which, when executed, implement some or all of the function functionality described above as being implemented by the test controller 102. For example, the test execution engine 106 and the context controller 112 may be stored in the memory 404 for execution by the processing unit 402.

The computing device 400 may have one or more Ethernet interfaces 412, which may be used for connecting to a wide-area network such as the Internet. The computing device 400 may also have one or more USB ports 414 for communicating with external devices such as the target device 104.

The computing device 400 may have various other elements such as a keyboard, a mouse, a touch-sensitive display, voice input device, etc. Output device(s) such as a display, speakers, a printer, etc. may also be included.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
    obtaining a test procedure for a test of an application, wherein the test procedure (a) provides input to the application, (b) determines whether the application passes the test, and (c) monitors one or more performance parameters associated with the application;
    performing multiple iterations to produce multiple test records, wherein each iteration comprises:
        randomly selecting one or more conditions of a device state;
        configuring a device to have the device state;
        initiating the test procedure to perform the test of the application; and
        recording a test record, the test record indicating (a) the device state, (b) whether the application passed the test, and (c) a context score based at least in part on the one or more performance parameters;
    utilizing the multiple test records to create a predictive model that predicts whether a postulated device state will cause the test of the application to fail;
    identifying multiple postulated device states that the predictive model predicts will cause the test of the application to fail; and
    performing further testing using each of the multiple postulated device states.

2. The method of claim 1, wherein the utilizing comprises using machine learning to create the predictive model based at least in part on the multiple test records.

3. The method of claim 1, wherein the utilizing comprises using a Monte Carlo method to create the predictive model based at least in part on the multiple test records.

4. The method of claim 3, wherein randomly selecting the one or more conditions comprises randomly selecting a condition variable from a probability distribution of the condition variable.

5. The method of claim 1, further comprising performing the multiple iterations with respect to multiple devices, wherein the test record of the multiple test records indicates, for the device of the multiple devices, (a) the device state, (b) whether the application passed the test, and (c) the context score based at least in part on the one or more performance parameters.

6. The method of claim 1, wherein the device state and the postulated device states each comprise one or more of:
    a processor type;
    a processor speed;
    an amount of processor resources available to the application;
    a number of processor cores available to the application;
    a device type;
    a display type;
    a device model;
    a display aspect ratio;
    a display resolution;
    an operating system version;
    a type of network communications available to the application;
    a quality of network communications available to the application;
    a strength of a wireless communications signal;
    a number of applications that are running;
    an amount of device memory that is available for use by the application;
    a battery state; or
    availability of device peripherals.

7. One or more non-transitory computer-readable media storing computer-executable instructions that, when executed by one or more processors, cause the one or more processors to perform actions comprising: performing multiple test procedures to produce multiple test results, wherein a test procedure comprises: randomly selecting, as a randomly selected device state, a device state; configuring a device to have the randomly selected device state; performing a test of an application; determining a context score based at least in part on one or more performance parameters of the application during the test; and recording a test result, the test result indicating the randomly selected device state under which the test was performed, the context score, and whether the application passed the test; utilizing the multiple test results to create a predictive model that predicts a predictive test result for a postulated device state; identifying multiple postulated device states that the predictive model predicts will result in a failing context score and negative test results; and performing additional test procedures based at least in part on the multiple postulated device states, to produce additional test results.

8. The one or more non-transitory computer-readable media of claim 7, wherein performing the multiple test procedures further comprises performing multiple iterations to produce the multiple test results.

9. The one or more non-transitory computer-readable media of claim 7, the actions further comprising testing the application on the device in one or more of the multiple postulated device states.

10. The one or more non-transitory computer-readable media of claim 7, the actions further comprising testing on another device in one or more of the multiple postulated device states.

11. The one or more non-transitory computer-readable media of claim 7, wherein the utilizing comprises using machine learning to create the predictive model.

12. The one or more non-transitory computer-readable media of claim 7, wherein the utilizing comprises using a Monte Carlo method to create the predictive model.

13. A method comprising: producing multiple test results, wherein producing a test result comprises: randomly selecting, as one or more randomly selected test contexts, one or more test contexts; performing a test of an application under each of the one or more randomly selected test contexts; and recording which of the one or more randomly selected test contexts the test was performed under, a context score based at least on one or more performance parameters associated with the application, and whether the application passed the test, for each of the multiple test results; utilizing the multiple test results to predict postulated contexts other than the tested contexts that are likely to cause the test to produce negative results; and performing further testing with one or more of the postulated contexts.

14. The method of claim 13, wherein producing each test result comprises performing multiple iterations.

15. The method of claim 13, wherein each of the tested contexts and the postulated contexts includes a condition under which the test is performed.

16. The method of claim 13, wherein each of the tested contexts and the postulated contexts includes a device state with which the test is performed.

17. The method of claim 13, wherein the utilizing comprises using machine learning to identify the postulated contexts.

18. The method of claim 13, wherein the utilizing comprises using a Monte Carlo method to identify the postulated contexts.

19. The one or more non-transitory computer-readable media of claim 7, the actions further comprising:
   utilizing the additional test results to improve the predictive model that predicts the test result for a postulated device state.

20. The method of claim 13, wherein the one or more randomly selected test contexts include one or more inputs from a test controller that change, during a test procedure, at least a test context of the one or more randomly selected test.

* * * * *